No. 889,705. PATENTED JUNE 2, 1908.
J. M. MATHIS & E. M. STAGGS.
LOCK NUT.
APPLICATION FILED NOV. 6, 1907.

Witnesses
Hugh H. Ott.
R. M. Smith.

Inventors
John M. Mathis
E. M. Staggs
By Victor J. Evans
Attorney

UNITED STATES PATENT OFFICE.

JOHN M. MATHIS AND ELL M. STAGGS, OF STERLING CITY, TEXAS.

LOCK-NUT.

No. 889,705.  Specification of Letters Patent.  Patented June 2, 1908.

Application filed November 6, 1907. Serial No. 400,949.

*To all whom it may concern:*

Be it known that we, JOHN M. MATHIS and ELL M. STAGGS, citizens of the United States, residing at Sterling City, in the county of Sterling and State of Texas, have invented new and useful Improvements in Lock-Nuts, of which the following is a specification.

This invention relates to nut locks, the object of the same being to provide simple and effective means for locking a nut on a bolt and readily unlocking the same, the device comprising an element which has an interlocked engagement with both the nut and bolt and which has associated therewith a movable pry or lever by means of which the locking device may be disengaged from the bolt for permitting the nut to be removed therefrom.

While the invention is especially designed with reference to nuts used on axle spindles generally, it will also be apparent as the description proceeds that the device is applicable to nuts and bolts used for any purpose.

With the above and other objects in view, the invention consists in the novel construction, combination and arrangement of parts hereinafter fully described, illustrated and claimed.

Figure 1:
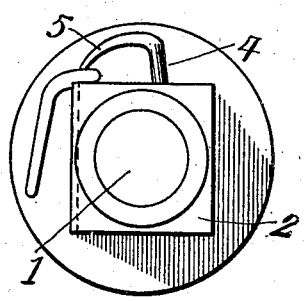
Figure 2:
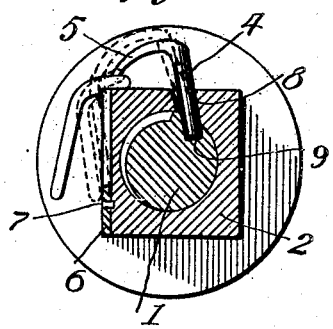
Figure 3:
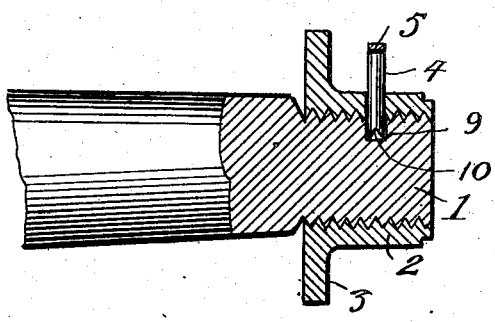
Figure 4:
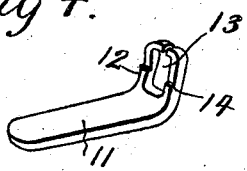

In the accompanying drawings, Figure 1 is an end view of a bolt, showing the nut and nut lock applied thereto. Fig. 2 is a sectional view of the nut locking device taken at right angles to the axis of the bolt. Fig. 3 is a section taken longitudinally of the bolt and showing a nut locked thereon by the improved device. Fig. 4 is a detail perspective view of the disengaging lever or pry detached from the lock.

In the drawings, 1 designates the threaded end of an axle spindle, but it will be understood that the part 1 may constitute the threaded end of a bolt, the locking device being applicable to either.

2 designates a nut threaded on the spindle 1, said nut being adapted for use on axle spindles by providing the same with the usual abutment flange 3.

In carrying out the present invention, we employ a locking device consisting of a locking pin 4 which is formed integrally with and carried by a spring 5 curved throughout its length and connected with an attaching shank 6 also by preference formed integrally with the spring and pin, as shown in Fig. 2, the shank 6 being secured by a suitable fastener 7 to one of the flat sides of the nut and under the preferred embodiment of the invention, the shank 6 is let into a groove formed in the side of the nut as indicated in Figs. 1 and 2, so that the outer surface of the shank will lie flush with the corresponding face of the nut, thereby not interfering in the least with the application of a wrench to the nut for turning the same off or on the spindle or bolt.

The pin 4 passes through a hole 8 in the nut and is adapted to enter a socket 9 in the threaded portion of the bolt, thereby locking the nut to the bolt and preventing relative rotative movement between the said nut and bolt. Furthermore, the inner extremity of the pin 4 is provided with a V-shaped notch 10 which is adapted to ride on the thread of the bolt or spindle in turning the nut on or off the same. The notched end of the pin traverses the thread until it reaches the socket 9 whereupon the inner end of the pin snaps into said socket and locks the nut to the bolt.

To unlock the nut, we provide a pry or lever shown in Fig. 4, comprising a handle 11 and a short arm 12 disposed at an angle to the handle and provided with an eye or opening 13 through which passes the spring portion 5 of the lock, as indicated in Figs. 1 and 2. In addition to the eye 13, the arm 12 of the lever is provided with a fulcrum shoulder 14 and where the shoulder occurs immediately adjacent to the eye 13 as illustrated in Fig. 4, the shoulder is divided in two by the eye or in other words, two oppositely located shoulders 14 are formed which however constitute but a single fulcrum shoulder when applied to the nut in the manner illustrated in Figs. 1 and 2. The lever or pry is ordinarily loose on the spring portion 5 of the locking device but when it is desired to unlock the nut, the lever is moved to the position illustrated in Figs. 1 and 2, so that the shoulder 14 will bear against the corner of the nut with the handle 11 standing off from the side of the nut. The handle 11 is then pressed toward the nut and bolt as indicated by dotted lines in Fig. 2, which results in prying up and deflecting the spring portion 5 thereby forcing the locking pin 4 outward to an extent which will remove it from engagement with the socket 9 in the bolt or spindle 1. The nut may then be turned and removed. The pin operating lever or pry forms a part of the locking device and is carried thereby at all times.

Having thus fully described the invention, what is claimed as new is:—

1. A nut provided with an opening through one side thereof, a locking pin movable in said opening and secured to the nut by a spring connection which sets in a groove in the side of the nut and lies flush therewith, and a pin operating pry or lever loosely mounted on the spring connection and having a fulcrum shoulder movable into and out of engagement with an angle or corner of the nut.

2. A nut provided with an opening through one side thereof, a locking pin movable in said opening and provided with a notch in its inner end and secured to the nut by a spring connection which sets in a groove in the side of the nut and lies flush therewith, and a pin operating pry or lever loosely mounted on the spring connection and having a fulcrum shoulder movable into and out of engagement with an angle or corner of the nut, substantially as described.

In testimony whereof we affix our signatures in presence of two witnesses.

JOHN M. MATHIS.
ELL M. STAGGS.

Witnesses:
EMETTE WESTBROOK,
R. H. PATTERSON.